United States Patent [19]

Kresse, Jr. et al.

[11] Patent Number: 5,221,585
[45] Date of Patent: Jun. 22, 1993

[54] JOINT FOR SINGLE SIDE WELDING AND SELF-FIXTURING OF CLOSED STEEL SECTIONS

[75] Inventors: Alfred L. Kresse, Jr., Romeo; Gregory L. Nagel, Troy, both of Mich.

[73] Assignee: General Motors Corporation, Detroit, Mich.

[21] Appl. No.: 898,655

[22] Filed: Jun. 15, 1992

Related U.S. Application Data

[60] Continuation-in-part of Ser. No. 608,871, Nov. 5, 1990, abandoned, which is a division of Ser. No. 569,486, Aug. 20, 1990, Pat. No. 4,993,619, which is a continuation of Ser. No. 386,669, Jul. 31, 1989, abandoned.

[51] Int. Cl.$^5$ ............... E04C 2/34; B62D 25/00; B62D 25/04
[52] U.S. Cl. .................. 428/573; 428/582; 428/586; 428/594; 428/598
[58] Field of Search ............ 228/135, 173.6, 212, 228/137; 403/271, 272; 428/571, 573, 574, 575, 582, 586, 594, 598; 52/805

[56] References Cited

U.S. PATENT DOCUMENTS

| 90,322 | 5/1869 | Vansbone | 228/173.6 |
|---|---|---|---|
| 578,801 | 3/1897 | Wilmot | 219/105 |
| 782,417 | 2/1905 | Robb | 428/582 |
| 1,484,579 | 2/1924 | Still | 228/171 |
| 1,728,964 | 9/1929 | Gross | 52/805 |
| 1,773,168 | 8/1930 | Vienneau | 217/105 |
| 1,863,873 | 6/1932 | Quarnstrom | 228/146 |
| 2,330,207 | 9/1943 | England et al. | 219/105 |
| 2,619,574 | 11/1952 | Lambert et al. | 219/10 |
| 2,664,182 | 12/1953 | Williams et al. | 52/805 |
| 2,889,619 | 6/1959 | Robinson | 228/137 |
| 3,301,992 | 1/1967 | Seeloff | 219/105 |
| 4,365,736 | 12/1982 | Stumm | 228/135 |
| 4,513,064 | 4/1985 | Marcus | 428/582 |
| 4,756,069 | 7/1988 | Morikawa | 228/135 |

FOREIGN PATENT DOCUMENTS 1134557 8/1962 Fed. Rep. of Germany ........ 52/805

Primary Examiner—John Zimmerman
Attorney, Agent, or Firm—Charles E. Leahy

[57] ABSTRACT

Two sheet metal panels are joined together to form a closed box section structure. The two panels are individually stamped from a blank and each has a flange along one edge and a toothed edge of alternating notches and tabs along the opposite edge. The two panels are assembled in box section forming relationship with the flanges of the two panels abutting with one another and the toothed edges abutting with one another with the tabs of the one panel interdigitating with the tabs of the other panel. Clamps are applied to the panels and urge the interdigitating tabs into tight fitting relationship. Then the panels are welded together at the interdigitating tabs and also at the abutting flanges to form the closed box section structure. The toothed edges of the panels preferably extend generally normal to one another and the length of the tab is not substantially less than the length of the notch which receives the tab so that the interlocking tabs and notches align the panels longitudinally relative one another pending the welding together of the panels. The weld may be a single sided spot resistance weld, an arc weld, or a laser weld.

3 Claims, 3 Drawing Sheets

JOINT FOR SINGLE SIDE WELDING AND SELF-FIXTURING OF CLOSED STEEL SECTIONS

REFERENCE TO RELATED APPLICATIONS

This is a continuation-in-part application of Ser. No. 07/608,871 filed Nov. 5, 1990 now abandoned, which was a division of application Ser. No. 07/569,486 filed Aug. 20, 1990, now U.S. Pat. No. 4,993,619 issued Feb. 19, 1991 which was a continuation of Ser. No. 07/386,669 filed Jul. 31, 1989 now abandoned.

The invention relates to closed box section structures such as vehicle body windshield pillars and more particularly provides interlocking tabs acting between the abutting edges of two panels welded together.

BACKGROUND OF THE INVENTION

It is well known in the fabrication of motor vehicle bodies to provide a closed box section structure by welding together a pair of sheet metal panels. For example the windshield pillar of a vehicle body is typically constructed of a first panel and a second panel which are separately stamped into shapes which have flanges along the lateral edges which fit together and define a closed hollow box section. The flanges overly one another and are conventionally pinch welded together. The flanges must have a sufficient width to provide a clamping surface by which the flanges may be clamped together. Furthermore, the width of the flange must be sufficient to receive the spot weld which attaches the two flanges together.

A disadvantage of the aforedescribed pillar construction is that the flanges project outwardly from the closed box section and thereby add to the dimension of the windshield pillar which in turn affects the aesthetics of the vehicle.

It would be desirable to provide a method by which two stamped panels could be joined into a closed box section without the disadvantage of a flange projecting from the finished structure.

SUMMARY OF THE INVENTION

According to the present invention two sheet metal panels are joined together to form a closed box section structure. The two panels are individually stamped from a blank and each has a flange along one edge and a toothed edge of alternating notches and tabs along the opposite edge. The two panels are assembled in box section forming relationship with the flanges of the two panels abutting with one another and the toothed edges abutting with one another with the tabs of the one panel interdigitating with the tabs of the other panel. Clamps are applied to the panels and urge the interdigitating tabs into tight fitting relationship. Then the panels are welded together at the interdigitating tabs and also at the abutting flanges to form the closed box section structure. The toothed edges of the panels preferably extend generally normal to one another and the length of the tab is not substantially less than the length of the notch which receives the tab so that the interlocking tabs and notches align the panels longitudinally relative one another pending the welding together of the panels. The weld may be a single sided spot resistance weld, an arc weld, or a laser weld.

Accordingly, the object, feature and advantage of the invention resides in the method of welding together a pair of preformed panels in which the panels have flanges along one edge abutting with one another and toothed edges along the other edge of the panels comprised of tabs on the one panel which interlock into opposing notches in the other panel to align and retain the panels relative one another during subsequent welding together of the panels at the edges thereof.

Another feature, object and advantage of the invention resides in the provision of a closed box section structure for a vehicle body in which the traditional pinch weld flange of substantial width is replaced by interlocking tabs and notches provided along one edge of the two panels and interlocking with one another to be welded together.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
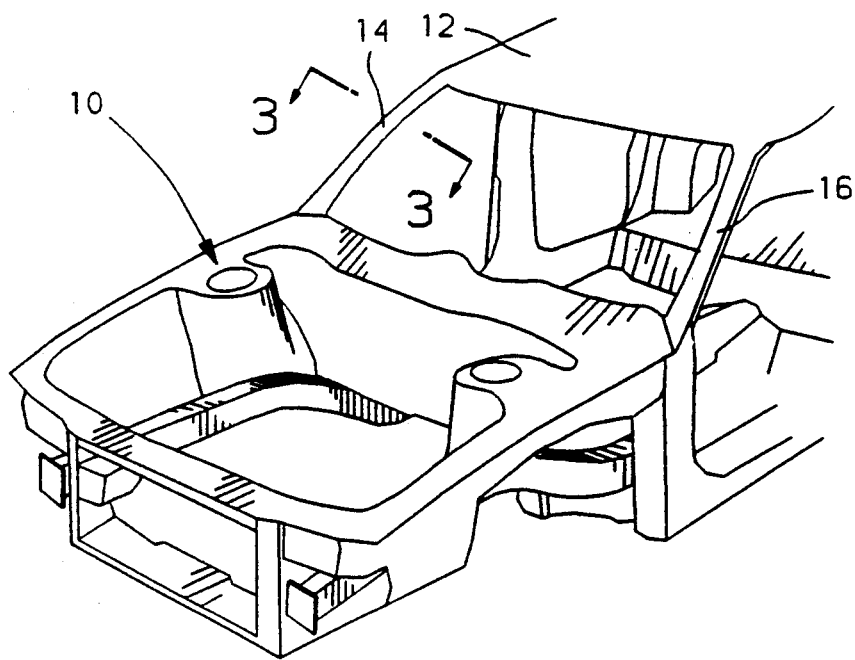
FIG. 1 is a perspective view of a vehicle body structure.

Referring to FIG. 1 there is shown a motor vehicle body generally indicated at 10 and comprised of stamped sheet-steel members which are welded together. The vehicle body includes a roof 12 and windshield pillars 14 and 16. The pillars are formed by welding together an outer panel and an inner panel which each have an L-shape to form a closed box section member.

Figure 2:
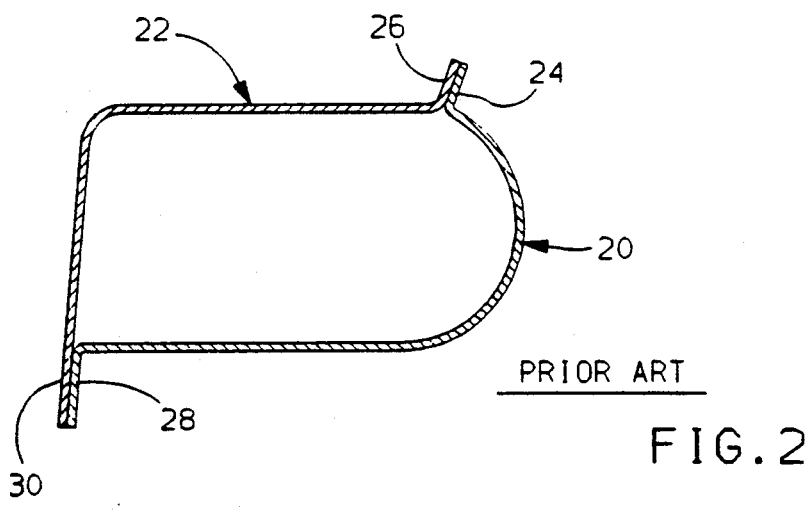
FIG. 2 is a sectional view taken through the windshield pillar of a prior art vehicle body showing the degree to which the pinch weld flange adds to the dimension of the pillar.

FIG. 2 shows a prior art windshield pillar construction including inner panel 20 and outer panel 22. The inner panel 20 has a flange 24 along one edge thereof which abuts with a similar flange 26 along the lateral edged of the outer panel 22. The flanges 24 and 26 are connected together by spot welds provided at intervals along the length of the flanges. The weatherstrip from the door is mounted on the flanges 24 and 26.

The other lateral edge of the inner panel 20 has a flange 28 which overlies a flange 30 of the outer panel 22. Flanges 28 and 30 are connected together by spot welds provided at intervals along the flanges. As seen in FIG. 2, the welding together of the flanges of the inner panel 20 and the outer panel 22 provide a closed box section. Furthermore, as seen in FIG. 2, the flanges necessarily project from the confines of the closed box section and accordingly determine the overall width of the pillar structure. It is desirable to limit the dimension of the flanges to the maximum extent possible, however, a substantial flange width is required in order to clamp the flanges together for welding and in order to receive the spot welds along the length of the flanges.

Figure 3:
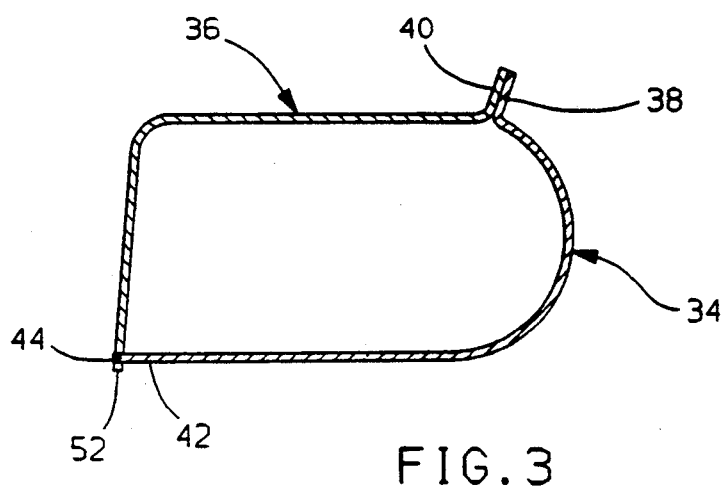
FIG. 3 is a sectional view taken in the direction of arrows 3—3 of FIG. 1 through the windshield pillar constructed according to the present invention.

FIG. 3 shows the pillar of the present invention. The inner panel 34 and the outer panel 36 respectively have flanges 38 and 40 which abut one another and are welded together. The opposite lateral edges of the inner panel 34 and outer panel 36 are welded together without a flange structure projecting therefrom as shown in FIG. 3 so that the overall dimension of the pillar structure is less than the prior art construction of FIG. 2.

Figure 4:
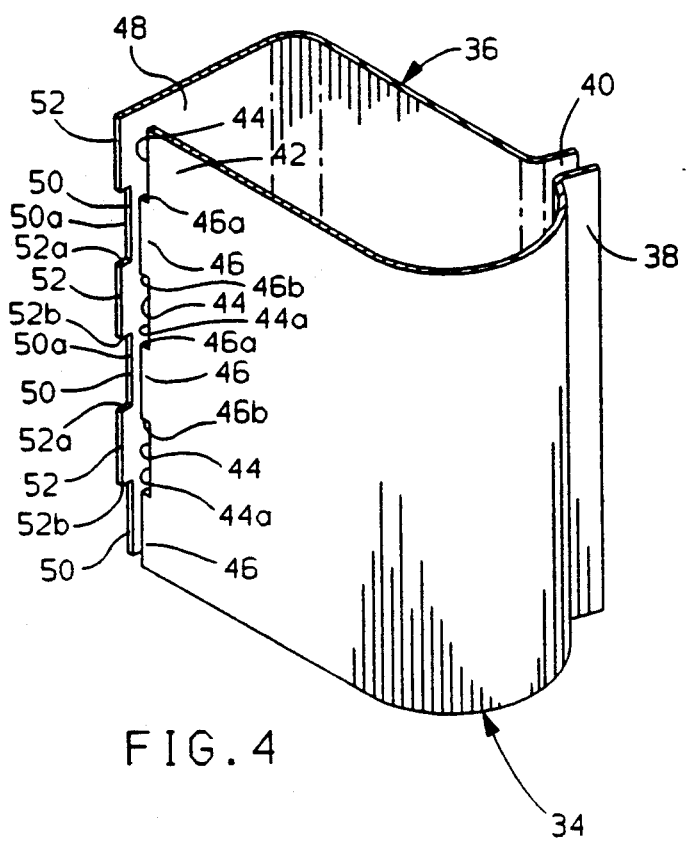
FIG. 4 is a perspective view of the windshield pillar of the present invention prior to the welding together of the separately stamped panels to define a closed box section pillar structure.
Figure 5:
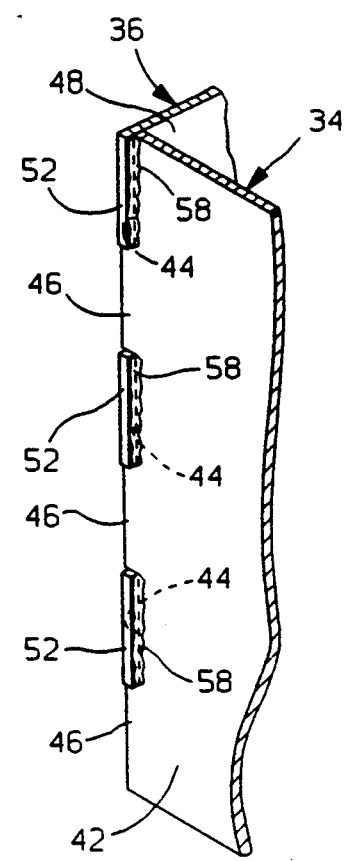
FIG. 5 is a partial fragmentary view of the panels of FIG. 4 shown with the panels positioned with the tabs and notches interlocking together and connected by arc welds.

Referring to FIG. 4 it is seen that the inner panel 34 has notches 44 along the length of the edge 42 thereof which define projecting tabs 46. The outer panel 36 lateral edge portion 48 has notches 50 spaced along the length of the lateral edge 48 thereof to define tabs 52. The tabs 46 of inner panel 34 are staggered with respect to the tabs 52 of the outer panel 36 so that the panels fit together as shown in FIG. 5 with the tabs 46 of inner panel 34 fitting into the notches 50 of the outer panel 36. Likewise, the tabs 52 of the outer panel 36 fit into the notches 44 of the inner panel 34.

Referring again to FIG. 4 it is seen that the tabs and the notches are rectangular in shape and that the tabs 46 of the inner panel 34 have edge walls 46a and 46b which define length of the tabs 46 and the length of the notches 44. The notch 44 has a bottom wall 44a which defines the depth of the notch 44. Tabs 52 have edge walls 52a and 52b. Notch 50 has a bottom wall 50a. The tabs 46 of inner panel 34 have substantially the same length as the length of the notches 50 in the outer panel 36. Likewise the tabs 52 of the outer panel 36 have a length equal to the notches 44. Accordingly, with the tabs interlocked in the notches of the opposing panel, the panels are fixedly located relative one another in the longitudinal direction. In addition, it is seen that the notches 50 and 44 have a depth which is approximately the same of somewhat greater than the thickness of the sheet steel used to make the inner panel 34 and outer panel 36.

Furthermore, as shown in FIG. 5, the interlocking of the panels with the tabs seated tightly at the bottom of the notches reliably locate the two panels relative to one another to prevent the panels from moving inwardly relative one another. Furthermore, as seen in FIG. 5, the tabs 52 have a length greater than the thickness of the sheet steel of the inner panel 42 to provide a niche in which a bead of weld 58 may be applied to permanently affix the two panels together. The flanges 38 and 40 at the opposite lateral edges of the inner panel 34 and outer panel 36 are conventionally joined together by spot welds along the length thereof.

METHOD OF ASSEMBLY

As best seen in FIG. 4, it will be understood that the two panels 34 and 36 are assembled together by inserting the tabs 46 and 52 of the panels into the corresponding notches 50 and 44 of the other panel to effectively interlock the panels together against relative longitudinal movement. Furthermore, it will be appreciated that the flanges 38 and 40 are merely juxtaposed into engagement with one another devoid and independent of any interlocking notches, tabs, or other features which would require a precise longitudinal alignment between the panels 34 and 36. Accordingly, by having the longitudinal interlocking tabs and notches at only the one side of the panels 34 and 36, while the other side of the panels defined by the engaging flanges 38 and 40 are devoid of any interlocking features, longitudinal movement is permitted between the panels 34 and 36 as required for the effective interlocking engagement between the tabs and notches. In this manner, the closed box section structure can be assembled from the two panels 34 and 36 irrespective of spring back or other dimensional variation which may be introduced during the stamping and handling of the L-shaped panels 34 and 36.

Figure 6:
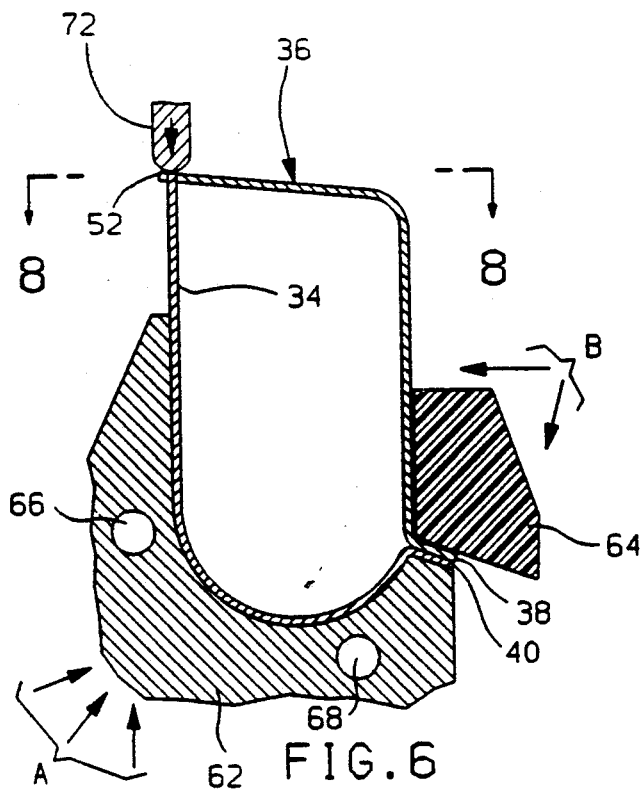
FIG. 6 shows the panels being clamped together and welded by a spot welder.

FIG. 6 shows the inner panel 34 and the outer panel 36 being joined together by a resistance welder. A clamp 62 and a clamp 64 act respectively on the inner panel 34 and the outer panel 36 to clamp the panels together with the tabs and notches in interlocking relationship. As seen in FIG. 6, the clamp 62 applies force in the direction of arrows "A" and the clamp 64 applies force in the direction of arrows "B" so that the notches and tabs of the two panels are retained in tight fitting interlocking relationship with one another. The clamp 62 is a backup electrode and has water cooling channels 66 and 68. The clamp 64 is an electrically non-conductive clamp and is preferably constructed of Fiberglas.

Figure 8:
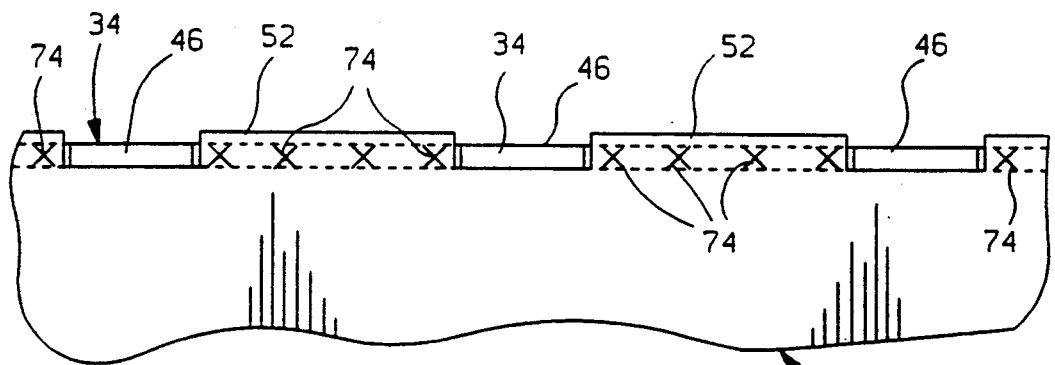
FIG. 8 is a view taken in the direction of arrows 8—8 of FIG. 6 and showing the panels connected by the resistance spot welding.
Figure 9:
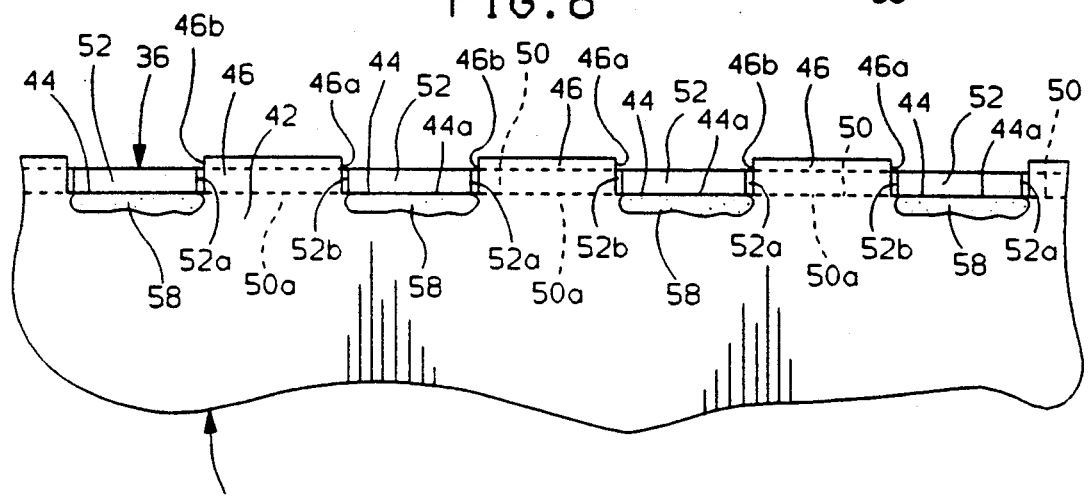
FIG. 9 is a view showing the panels connected together by arc welding similar to FIG. 5.

To weld the inner panel 34 and outer panel 36 together, a primary electrode is engaged with the outer panel 36 and provides a series of spot welds along the length of the pillar. As best seen in FIG. 8 the spot welds 74 are provided along the tabs 52 and fuse the tabs 52 to the bottom wall of the notches of the inner panel 34. Alternatively, the spot welds could be applied along the tabs 46. After the outer and inner panels are welded together along the interlocking tabs and notches, the clamps 62 and 64 are removed and the flanges 38 and 40 are conventionally welded together by resistance spot welds along the lengths thereof.

Figure 7:
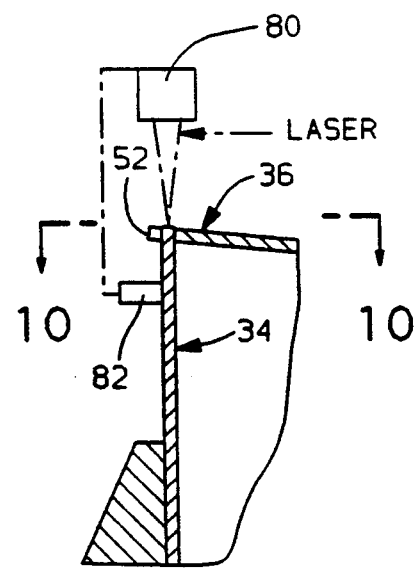
FIG. 7 shows the panels clamped together and being welded by a laser welder.
Figure 10:
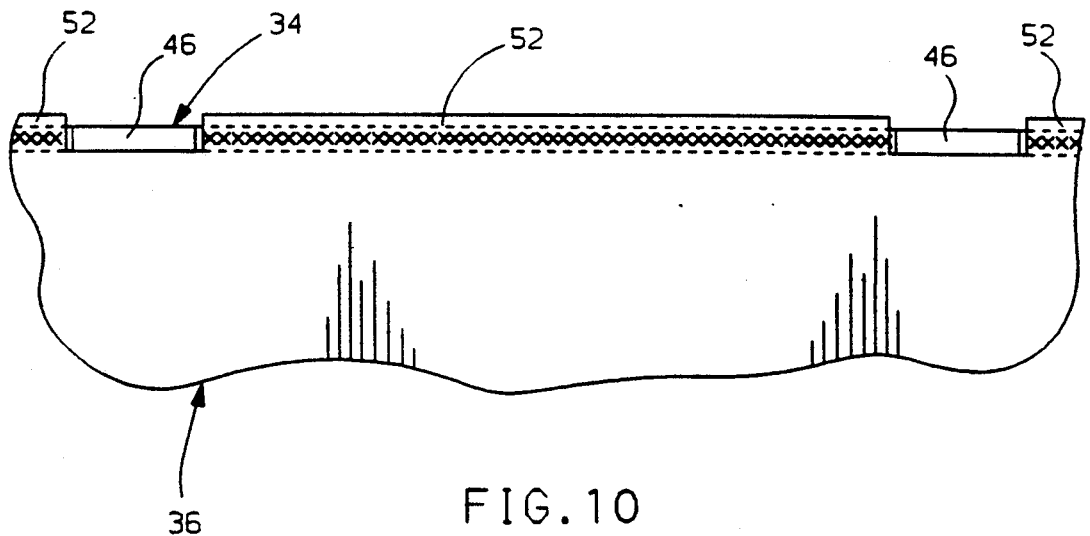
FIG. 10 is a view taken in the direction of arrows 10—10 of FIG. 7 showing the panels connected together by laser welding.

Referring to FIG. 7 it is seen that the panels can also be welded together by a laser weld. The laser 80 is guided by a probe 82 which senses the location of the inner wall 34 beneath the outer wall 36 and controls the location and movement of the laser 80. The laser 80 is preferably of the type having a mirrored beam delivery system 80 and fuses the tabs 52 into the bottom wall of the notches as seen in FIG. 10. FIG. 10 shows that the tabs 52 may have a relatively longer length than the mating tabs 46 of the inner panel 34 so as to increase the length of the weld acting between the two panels.

It will be understood that the panels may be first welded together at either the pitch weld flange 38, 40, or at the opposite edge having the interlocking tabs and notches. In either case, the clamping of the parts will force the tabs into the required tight fitting relation in the notches of the opposite panel and also position the flanges in abutting relationship with one another. Although the drawings show each tab having the same length as the corresponding notch, it is sufficient if at least one of the tabs fits tightly in its notch in order to align the panels longitudinally with respect to one another.

Thus it is seen that the invention provides a new and improved closed box section structure for vehicle body, and a method for the assembly of a pair of panels to comprise a closed box section.

The embodiments of the invention in which an exclusive property or privilege is claimed are defined as follows:

1. A closed box-section structure for a vehicle body comprising:

first and second panels having opposite lateral edge portions adapted to abut with one another for subsequent fastening together to form a closed box-section shape, each panel having a flange projecting therefrom along one edge and a toothed edge of notches and tabs along the other edge, said panels being juxtaposed to one another with said flanged edges abutting one another face-to-face in a manner permitting movement of one panel longitudinally relative to the other before the subsequent fastening together of the panels, said toothed edges abutting one another with at least one tab of one panel fitting in close fitting relationship into an opposing notch of the other panel so that the panels interlock in self fixturing relationship with one another to fixedly locate one panel relative to the other before the subsequent fastening together of the panels, and fastening means acting between the two panels to retain the toothed edges together and retain the flanged edges together.

2. A closed box-section structure for a vehicle body comprising:

first and second panels having opposite lateral edge portions adapted to abut with one another for subsequent fastening together to form a closed box-section shape, each panel having a flange projecting therefrom along one edge and a toothed edge of alternating notches and tabs along the other edge, said panels being juxtaposed to one another with said flanged edges abutting one another face-to-face in a manner permitting movement of one panel longitudinally relative to the other before the subsequent fastening together of the panels, said toothed edges abutting one another with the rectangular shaped tabs of the one panel fitting in close fitting relationship into opposing notches of the other panel so that the panels interlock in self fixturing relationship with one another to fixedly locate one panel relative to the other before the subsequent fastening together of the panels, and weld means acting between the two panels at the edges thereof to retain the toothed edges together and retain the flanged edges together.

3. A closed box-section structure for a vehicle body comprising:

first and second panels of generally L-shaped cross-section having opposite longitudinally extending lateral edge portions adapted to abut with one another for subsequent fastening together to form a closed box-section shape, each panel having a flange projecting therefrom along one edge and a toothed edge of alternating rectangular shaped notches and tabs along the other edge, said panels being juxtaposed to one another with said flanged edges abutting one another face-to-face in a manner permitting movement of one panel longitudinally relative to the other before the subsequent fastening together of the panels, said toothed edges abutting one another with rectangular shaped tabs of the one panel fitting in close fitting relationship into opposing rectangular shaped notches of the other panel so that the panels interlock in self fixturing relationship with one another to fixedly locate one panel relative to the other before the subsequent fastening together of the panels, and weld means acting between the two panels at the edges thereof to retain the toothed edges together and retain the flanged edges together.

* * * * *